(12) United States Patent
Julien

(10) Patent No.: US 6,454,016 B1
(45) Date of Patent: Sep. 24, 2002

(54) NITINOL HORSESHOES

(75) Inventor: Gerald J. Julien, Puyallup, WA (US)

(73) Assignee: Nitinol Technologies, Inc., Milton, WA (US)

( * ) Notice: Subject to any disclaimer, the term of this patent is extended or adjusted under 35 U.S.C. 154(b) by 28 days.

(21) Appl. No.: 09/654,236

(22) Filed: Sep. 2, 2000

Related U.S. Application Data

(60) Provisional application No. 60/152,517, filed on Sep. 2, 1999.

(51) Int. Cl.$^7$ .............................. A01L 1/00; B21K 15/02

(52) U.S. Cl. ............................................... 168/4; 59/61

(58) Field of Search ................... 168/4; 59/61

(56) References Cited

U.S. PATENT DOCUMENTS

| | | |
|---|---|---|
| 3,174,851 A | 3/1965 | Buehler |
| 4,091,871 A * | 5/1978 | Chiaramonte et al. ......... 168/4 |
| 4,753,465 A | 6/1988 | Dalby |
| 5,024,549 A | 6/1991 | Dalby |
| 5,160,802 A | 11/1992 | Moscrip |
| 5,226,683 A | 7/1993 | Julien et al. |
| 5,848,648 A * | 12/1998 | Preiss ............................ 168/4 |
| 5,868,013 A | 2/1999 | Julien |
| 6,267,402 B1 | 7/2001 | Julien |
| 6,293,020 B1 | 9/2001 | Julien |

FOREIGN PATENT DOCUMENTS

CH 587601 * 5/1977 .................... 168/4

* cited by examiner

Primary Examiner—Robert P. Swiatek
(74) Attorney, Agent, or Firm—J. Michael Neary

(57) ABSTRACT

A light weight horseshoe made of Type 55 Nitinol is bio-compatible and non-corrosive. It can be shaped at room temperature to fit the horse's hoof, and is extremely durable for long life and infrequent shoe changes, which helps avoid shoe nail damage to the hoof. It has low thermal conductivity to protect the horse's hoof from heat and a high specific damping capacity to protect the horse's hooves and legs from shock and vibration and also make it a quiet shoe. The horseshoe material has low initial yield strength, so it conforms to the microtopography of hard surfaces, which improves the grip of the horseshoe on such surfaces, but when strained its yield strength increases greatly so it becomes effectively unbreakable in use. The horseshoe may be treated to have a hard, extremely durable integral ceramic surface that improves the heat insulative properties of the horseshoe and give it an attractive color such as gold, blue or black that will not wear off, and the ceramic material is an electrical insulator. The shoe blank and nail holes are laser cut from a sheet of hot rolled Nitinol material and then hot forged on Type 60 Nitinol tooling to give the horseshoe the desired final surface profile. Alternatively, the shoe is cast from Type 55 Nitinol using a "lost wax" investment process. The formed or cast shoe is heat treated to give the desired properties of strength and toughness and to give it the desired integral ceramic surface finish.

7 Claims, 2 Drawing Sheets

NITINOL HORSESHOES

This pertains to U.S. Provisional Application No. 60/152,517 entitled "Nitinol Horseshoes" filed on Sep. 2, 1999.

BACKGROUND OF THE INVENTION

Horseshoes are currently fabricated from steel, aluminum or titanium. Steel horseshoes suffer from weight and bio-compatibility problems, but are inexpensive and easy for the furrier to fit to the hoof. Aluminum horseshoes are light weight but have poor strength and durability. Titanium horseshoes are light weight, but are not malleable and are fracture sensitive, and transmit shock without attenuation to the horse's hooves. They also are good heat conductors, so heat from hot pavement is conducted readily to the horse's hooves.

The horseshoe art has long needed a horseshoe that is light weight like aluminum and titanuim, but is durable, tough and strong for long life. It should also be corrosion resistant and bio-compatible with the horse's hoof and not support mold, fungus or hoof rot, and it should be malleable at low temperature, preferably at room temperature, to facilitate the farriers work in fitting the horseshoes to the particular horse. A particularly valuable feature of such an ideal horseshoe would be thermal insulative properties so that the hooves would not get hot when the horse is obliged to stand on hot pavement or a long time. Finally, a horseshoe that absorbs shock and vibration would be of great value in protecting the horse from fatigue and injury caused by running or walking for long periods on had surfaces such as concrete, rock or asphalt, and it would be a quiet shoe.

SUMMARY OF THE INVENTION

Accordingly, this invention provides a horseshoe that is light weight, bio-compatible, and non-corrosive. It can be shaped at room temperature to fit the horse's hoof, and is extremely durable for long life and infrequent shoe changes, which militates against shoe nail damage to the hoof. The inventive shoe has low thermal conductivity to protect the horse's hoof from heat in pavement and other heated surfaces on which he may be standing, and it has a high specific damping capacity to protect the horse's hooves and legs from shock and vibration and also makes it a quiet shoe. The horseshoe material has low initial yield strength, so it conforms to the micro-topography of hard surfaces such as concrete and rock, and improves the grip of the horseshoe on such surfaces, but when strained its yield strength increases greatly so it becomes effectively unbreakable. The low initial strength also offers some initial flexibility which allows the horse's hooves to flex naturally when in motion, thereby promoting healthy hooves and legs. The horseshoe may be treated to have a hard, extremely durable integral ceramic surface that improves the heat insulative properties of the horseshoe and give it an attractive color such as gold, blue or black that will not wear off, and the ceramic material is an electrical insulator.

The invention includes a horseshoe made of Type 55 Nitinol, an intermetallic compound having about 55% Nickel and 45% Titanium by weight. The shoe blank and nail holes are laser cut from a sheet of hot rolled Nitinol material and then hot forged on Type 60 Nitinol tooling to give the horseshoe the desired final surface profile. Alternatively, the shoe is cast from Type 55 Nitinol using a "lost wax" investment process. The formed or cast shoe is heat treated to give the desired properties of strength and toughness and to give it the desired integral ceramic surface finish.

DESCRIPTION OF THE DRAWINGS

The invention and its many attendant features and advantages will become better understood upon reading the following description of the preferred embodiments in conjunction with the following drawings, wherein.

DESCRIPTION OF THE PREFERRED EMBODIMENTS

Figure 1:
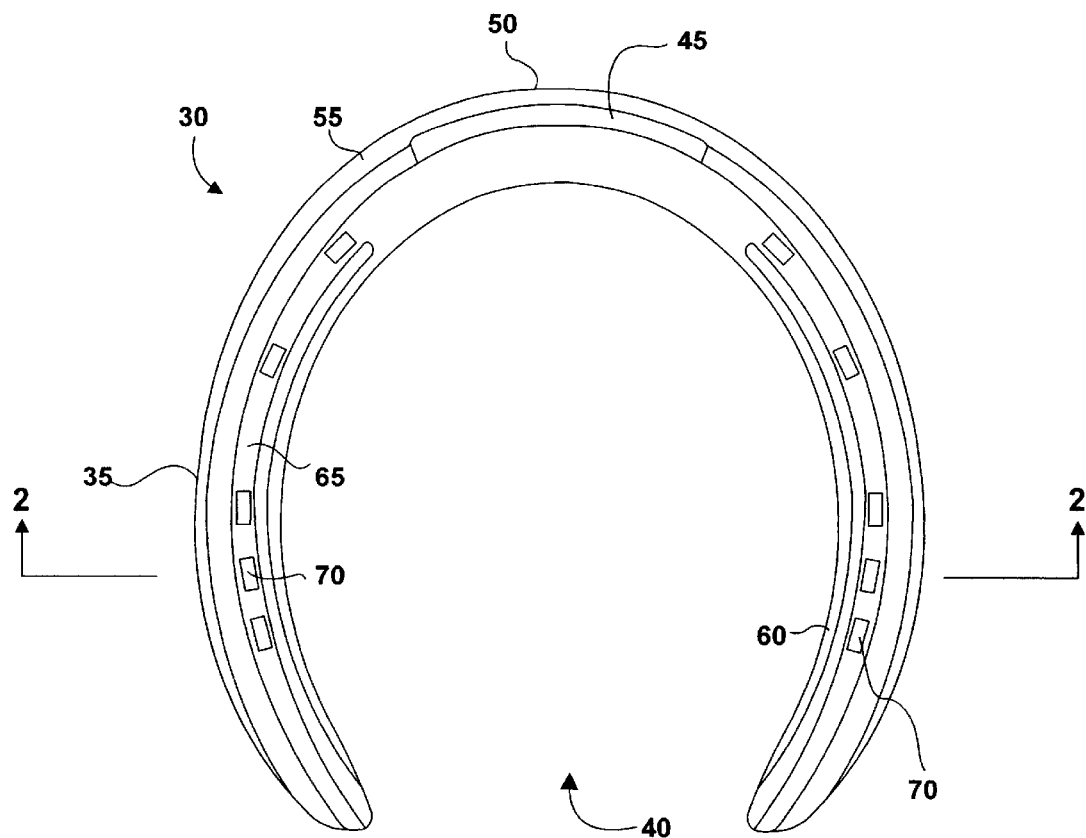
FIG. 1 is a plan view of a horseshoe in accordance with this invention.

Turning now to the drawings, wherein like reference characters designate identical or corresponding parts, and more particularly to FIG. 1 thereof, a horseshoe 30 is shown having a semi-annular curved body 35, open at the rear end 40 and having a cleat or digger 45 at the front end 50. An outside peripheral ridge 55 runs completely around the outside edge of the body 35, and an inside ridge 60 runs around the inside edge of the body 35 along two opposing arms of the body 35. A groove 65 lies between the outside ridge 55 and the inside ridge 60, and a plurality of square holes 70 extend through the body 35 from the groove 65 to the hoof engaging face 70 of the horseshoe 30.

The horseshoe 30 is made of Type 55 Nitinol, a known intermetallic compound of about 55% nickel and 45% titanium, by weight. Nitinol was invented by Buehler et al. in the early 1960's at the Naval Ordnance Laboratory and disclosed in U.S. Pat. No. 3,174,851. It was named after its composition (NiTi) and its origin (Naval Ordnance Laboratory, or NOL), and is sometimes spelled NiTiNOL, but more commonly just Nitinol. Type 55 Nitinol normally exists in one of two different states: Martensite or Austenite. In the Martensitic state, it has a low yield strength, on the order of 20 KSL but its yield strength increases as work is applied, up above 150 KSI. It has a remarkable ability to absorb and dampen vibration. It has a specific damping capacity of about 40%, one of the best damping capacity of any metallic. Type 55 Nitinol spontaneously changes state between Martensite and Austenite at a transition temperature that is dependant on the specific composition. By making small adjustments in the percentage of nickel and titanium, and possibly by adding small percentages of other materials, the transition temperature can be tailored to a particular desired temperature within a limited range. For the purposes of this invention, the desired transition temperature is high as possible so that the horseshoe will be in its Martensitic state in all or almost all conditions that a horse would be expected to experience. This is the meaning of the term "about" in the first sentence of this paragraph.

Despite the interesting properties noted above, Nitinol has never been offered as a material for horseshoes. One can speculate as to the reasons, but one possible reason is that Nitinol is very difficult to form, grind or machine, apparently because of its characteristic of increasing yield strength as cold work is applied. Even the hardest cutting tools are quickly dulled or broken when attempting to cut Nitinol. Grinding of Nitinol is slow and causes rapid wear of the grinding wheels, and is not particularly suited to making the curved groove 65 in the horseshoe, hence it would be uneconomical and unsuited to high volume horseshoe production. Forging has used for Nitinol, but it has been recognized as impractical because of the rapid wear of the hardest tool steel dies and the necessity for maintaining the critical forging temperature and forging rate to avoid immediate destruction of the tooling. The result has been a reluctance to even attempt a development program when the outcome appeared so doubtful and the likely cost of the horseshoes that would be produced appeared to be prohibitively high.

I have discovered that Nitinol can be cut readily by laser. Nitinol has low thermal conductivity, which apparently militates against conduction of heat away from the melt pool at the point of laser incidence so the cutting is fast and clean. Thus, it is now possible economically to cut horseshoe blanks out of a sheet of hot rolled Type 55 Nitinol, and also laser cut the square holes for the horseshoe nails. The horseshoe blanks can be nested closely on the sheet for laser cutting with little waste of material. They could also be cut as straight bars and then hot formed around a mandrel and allowed to air cool on the mandrel before removal to eliminate any springback.

Figure 2:
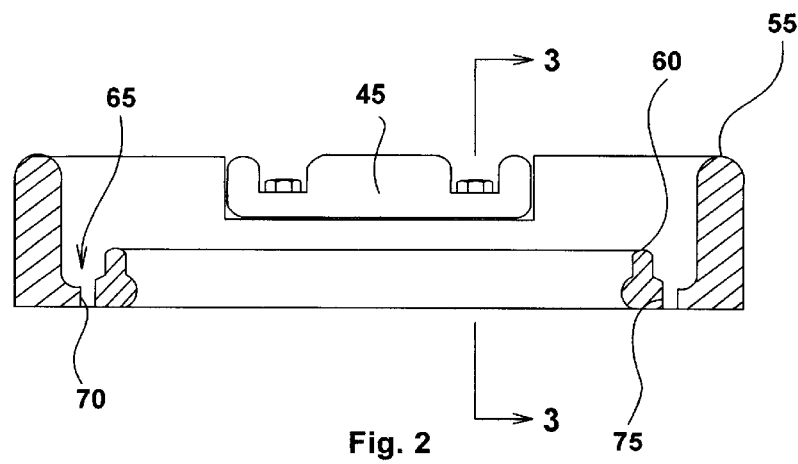
FIG. 2 is a cross-sectional elevation along lines 2—2 in FIG. 1.

The groove 65 can be made using either of two different methods. The first method is hot machining, using a CNC machine tool to rapidly cut the groove and reduce the inside ridge 60 to the desired height, as shown in FIG. 2. Type 55 Nitinol cuts readily when heated to an elevated temperature above 600° C. The horseshoe blank is held in a horseshoe-shaped recess in a fixture made of a plate of Type 60 Nitinol. Type 60 Nitinol is another Nitinol formulation having about 60% Nickel and 40% titanium by weight. It is stronger than Type 55 Nitinol and can be processes to have an electrically insulating integral ceramic surface finish. The recess is provided with electrodes at its two ends for conducting a high amperage, low voltage current to the horseshoe blank in the recess under control of a current controlled power supply. The cutter in the CNC machine tool can be gripped in the chuck with Type 60 Nitinol jaws processed to have the same ceramic surface finish as the fixture to provide electrical and thermal insulation between the cutter and the machine tool.

The heated horseshoe blank can also be hot forged to form the groove 65 and the ridges 55 and 60. Hot forging has the advantage of wasting little or no material, but it is difficult to forge Nitinol and the tooling can be worn quickly if it is not done properly. The forging dies are made of Type 60 Nitinol which is heat treated to about 62 RC and the horseshoe blank is heated to about 900° C. The forging stroke is slow, on the order of about one inch per minute and the horseshoe blank is maintained at the forging temperature for the entire forging stroke. The horseshoe blank sits on a block of Type 60 Nitinol during the forging stroke to provide thermal insulation from the platen of the forge to ensure that the blank is not thermally quenched by contact with the thermally conductive steel forge platen.

A third manufacturing technique for producing the horseshoes 30 to net shape is casting. The preferred casting process is the investment casting or "lost wax" process in which a wax mold is coated with a ceramic powder in a binder. The powder is applied over the wax form, first as a very fine powder and then subsequent layers as courser powder. After the binder has set, the mold is fired to burn off the wax. A large number of wax forms are used and connected in a tree so that a single pouring of molten Nitinol produces a large number of horseshoes. The molten Nitinol can be poured into the mold and the air in the mold is released through the interstices of the ceramic structure. When the Nitinol has hardened, the ceramic mold is broken away from the horseshoes, which are net shape and ready for heat treating to give them the ceramic surface finish.

Figure 3:
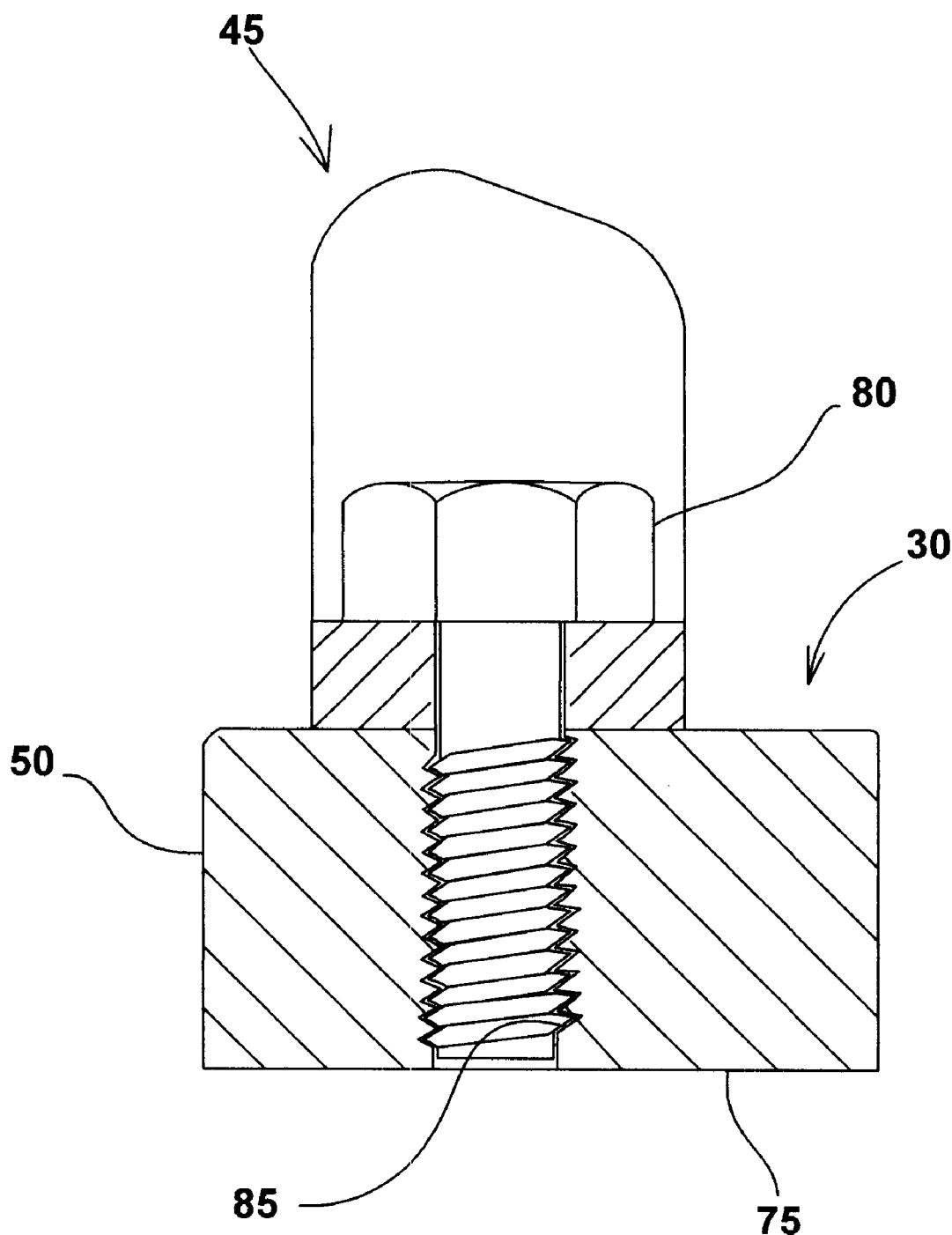
FIG. 3 is a cross-sectional elevation along lines 3—3 in FIG. 2.

The cleat or digger 45 is preferably removable, as shown in FIGS. 2 and 3. The cleat 45 is half-moon shaped and can be any desired height or profile. Taller shapes are desirable for wet or muddy conditions. Medium height cleats 45 are desirable for normal running conditions, and a low cleat, shown in FIG. 2, is desirable for stable and pasture periods. The cleat 45 is fastened by two screws 80 threaded into tapped holes 85 near the front edge 50 of the horseshoe 30. The threaded engagement of the fastener 80 in the tapped holes 85 holds well without loosening because of the nature of the Type 55 Nitinol which becomes stronger as it is cold worked. As the screw 80 is tightened in the tapped hole 85, the threads of the screw 80 strain the threads of the tapped hole 85 which increase in yield strength. Moreover, the straining of the threads in the tapped holes has the effect of spreading the load exerted by the screw 80 over all the threads and exerting a resilient restoring force, which effectively locks the screw 80 in place until it is removed by application of forceful reverse torque. Therefore, the screw 80 is effectively locked against loosening during use because of vibration.

The surface material formed on Type 55 Nitinol is believed to be a complex mixture of oxides, such as $Ti_4Ni_2O$, although there is still uncertainty about exact composition. It is probably a complex composition of several compounds of nickel, titanium, oxygen and nitrogen. Regardless of its composition, the surface material is very hard, (estimated to be 70 to 80 Rc,) has low friction, provides electrical insulation and improves the already excellent corrosion resistance of the horseshoes.

The surface material changes color at different temperatures and as a specific color is obtained further changes in the color can be stopped by quenching of the horseshoes. Some of the colors develop in a very narrow temperature range, such as the reds, greens and blues. The gold color temperature band is wide and occurs at low temperature, on the order of 500° C. The black surface material occurs at higher temperatures.

To produce colors other than black (gold, blue, green and red), the following steps should be followed:

The formed horseshoes are polished and cleaned in a strong detergent solution. The best color appearance is produced on polished surfaces. It is important that no residue from the grinding or polishing remains on the horseshoes during the following heat treating steps. The horseshoes are heated evenly using a propane or MAPP torch or other heat sources. In a large scale manufacturing operation, the horseshoes can be carried on a stainless steel belt through a heating tunnel where they are heated from above and below by torches.

When first setting up the process, the horseshoes are visually monitored for color changes. For example the first color to occur is gold. When the desired color of gold is obtained, the horseshoes are pushed off the belt and quenched in water. If the desired gold color has not been obtained the process can be repeated to obtain a darker gold. Other colors can be obtained by the application of additional heat and repeating the quenching operation. The temperature required to obtain some colors occurs in a very narrow temperature band, so if a horseshoe is allowed to continue to heat up some colors will disappear very fast. Very interesting colors and combinations of colors in rainbow patterns can be obtained.

Black surface material can be obtained on the horseshoes using the process is as described in the heat treatment descriptions above, merely by increasing the processing temperature.

It is also possible to polish the oxide coated horseshoes. Oxides of all colors are very attractive if they are polished. The surface finish is considered to be a ceramic, and finishes of less than 1.0 micro-inch RMS can be obtained.

Obviously, numerous modifications and variations of the preferred embodiment described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, I expressly intend that all these embodiments, species, modifications and variations, and the equivalents thereof, are to be considered within the spirit and scope of the invention as defined in the following claims.

I claim:

1. A horseshoe, comprising:
   a semi-annular body made of monolithic Type 55 Nitinol in the Martensitic state, having a high specific damping capacity of about 20–40% to absorb shock and vibration to help protect the horse's hooves and legs from injurious shock and vibration induced by running and walking on hard surfaces.

2. A process for making Nitinol horseshoes having a ground-engaging face with traction-enhancing peripheral ridges and a central groove, comprising:
   selecting a sheet of Type 55 Nitinol;
   laser cutting a blank horseshoe out of said sheet and laser cutting a plurality of square holes for horseshoe nails in said blank; and
   producing a said central groove in said ground-engaging face between inner and outer peripheral ridges.

3. A process for making Nitinol horseshoes as defined in claim 2, wherein:
   said sheet of Type 55 Nitinol is thinner than the maximum desired thickness of said horseshoes; and
   said producing step includes hot forging said blank horseshoe at a temperature of about 800° C.–950° C. to produce said inner and outer peripheral ridges and said central groove.

4. A process for making Nitinol horseshoes as defined in claim 2, wherein:
   said sheet of Type 55 Nitinol has a thickness about equal to the thickness of the desired horseshoe; and
   said producing step includes machining said groove in said ground-engaging face of said horseshoe blank at a temperature of about 800° C.–950° C.

5. A process for protecting the hooves and legs of a horse from shock and vibration induced during travel over hard surfaces, comprising:
   selecting a set of Type 55 Nitinol horseshoes having a specific damping capacity above 20%; and
   attaching said horseshoes to the hooves of said horse to absorb shock and vibration caused by said horseshoes striking hard surfaces when said horse runs or walks over said surfaces.

6. A process as defined in claim 5, wherein:
   said horseshoes have a specific damping capacity of about 40%.

7. A process as defined in claim 5, wherein:
   said set of Type 55 Nitinol horseshoes have a low initial yield strength of about 20 KSI, so that surfaces of said horseshoes that contact hard surfaces such as concrete and rock, over which said horse runs or walks, yield and conform to micro-topography of said hard surfaces and thereby provide enhanced gripping, superior traction, and resistance to sliding for a horse on said surfaces when said horse is running or walking over said hard surfaces.

* * * * *